US005555224A

United States Patent [19]

DePonty et al.

[11] Patent Number: 5,555,224

[45] Date of Patent: Sep. 10, 1996

[54] WHEELCHAIR SEATING INDICATOR AND METHODS OF CONSTRUCTING AND UTILIZING SAME

[75] Inventors: Ernest T. DePonty; Denise Billups, both of Spokane; Rocky Greenfield, Airway Heights, all of Wash.

[73] Assignee: Accucare, L.L.C., Spokane, Wash.

[21] Appl. No.: 516,792

[22] Filed: Aug. 18, 1995

[51] Int. Cl.[6] .................... G04B 4/00; B62M 1/14

[52] U.S. Cl. .................... 368/10; 368/76; 280/250.1; 280/304.1

[58] Field of Search .................... 368/10, 76, 80, 368/276, 278; 116/308; 280/250.1, 304.1

[56] References Cited

U.S. PATENT DOCUMENTS

| | | | |
|---|---|---|---|
| 4,345,541 | 8/1982 | Villa-Real . | |
| 4,419,016 | 12/1983 | Zoltan . | |
| 4,506,903 | 3/1985 | Bowermaster . | |
| 4,515,385 | 5/1985 | Christian | 280/289 WC |
| 4,553,770 | 11/1985 | Lyman . | |
| 4,677,861 | 7/1987 | Bartholomew . | |
| 4,925,242 | 5/1990 | Harris . | |
| 5,020,817 | 6/1991 | Leib | 280/250.1 |
| 5,242,179 | 9/1993 | Beddome et al. | 280/233 |

*Primary Examiner*—Vit W. Miska
*Attorney, Agent, or Firm*—Weiner, Carrier & Burt, P.C.; William F. Esser; Joseph P. Carrier

[57] ABSTRACT

A time monitoring device, comprising an elongated strip member which is suspended between posts of a wheelchair that support the wheelchair backrest and includes a graduated time scale printed thereon; a pointer member for indicating a particular time printed on the time scale of the strip member, and which slidably engages with the strip member; a handle member which is connected to the pointer member for manually positioning the pointer member relative to the time scale of the strip member; and a securing mechanism, connected to the pointer member, for substantially preventing the pointer member from moving along the time scale of the strip member while a person is seated in the wheelchair. The time indicated by the pointer member corresponds to the time at which the person was seated in the wheelchair.

20 Claims, 2 Drawing Sheets

WHEELCHAIR SEATING INDICATOR AND METHODS OF CONSTRUCTING AND UTILIZING SAME

BACKGROUND OF THE INVENTION

1. Field of Invention

This invention pertains to a health care monitoring device, and in particular to a monitor which is used in association with a wheelchair and indicates the amount of time a person has been seated in the wheelchair.

People whom are substantially confined to a bed or wheelchair experience an increased risk of contracting a plurality of harmful ailments. Such ailments are caused in part from placing a person's body in the same position in a bed or wheelchair for prolonged periods of time so that blood flow is at least partially restricted to major body parts, or a person's entire body weight is otherwise applied to small areas the person's body.

For example, decubitus ulcers (the degeneration of skin tissue) may be caused by restricted blood and/or oxygen to portions of the body. Treatment of decubitus ulcers include, among other procedures, skin grafts. Advanced stages of decubitus ulcers additionally expose the patient to other infections, such as mild bacterial and viral strain, as well as to potentially life-threatening strains such as staph infections. Decubitus ulcers and other related conditions pose a heightened danger to the elderly due to substantial muscle loss from the aging process.

The above-mentioned physical conditions are known to lead to potentially harmful and permanent psychological conditions or disorders as well, ranging from experiencing low self-esteem to chronic depression.

Accordingly, preventive measures to reduce the occurrence of the above-mentioned conditions include periodic medical treatments, including repositioning patients whom are confined to a wheelchair or a bed every two hours, and applying topical lotions on a regular, periodic basis. However, these preventive measures are only effective if followed on a periodic and substantially continual basis.

2. Description of the Relevant Art

There are known timing devices for administering the taking of medicine. For example, Wirtschafter U.S. Pat. No. 4,588,303, Mcintosh U.S. Pat. No. 5,088,056, and Tate U.S. Pat. No. 4,725,999 disclose a timers which monitor and/or record the receiving of medicine.

U.S. Pat. Nos. 4,925,242, 4,506,903 and 4,553,770 disclose devices which attach to wheelchairs.

U.S. Pat. Nos. 4,345,541, 4,419,016 and 4,677,861 disclose a variety of settable medical timers.

The above-mentioned references, however, fail to disclose or otherwise suggest a monitor which attaches to a wheelchair, indicates the amount of time a person has been seated therein, and/or includes a safety mechanism to prevent premature or otherwise inappropriate resetting of the monitor.

SUMMARY OF THE PRESENT INVENTION

The present invention overcomes the above-discussed limitations and shortcomings of known medical timers and satisfies a significant need for a device which is quickly and easily manipulated so as to clearly indicate when a wheelchair-confined or a bed-confined patient needs to be repositioned.

According to the present invention, there is disclosed a strip member which removably suspends between the posts that support the backrest of the wheelchair and includes a graduated time scale printed thereon; a time indicating member which slidably engages with the strip member proximal to the time scale thereof so as to point to a specific time thereon; and means for locking the time indicating member into position relative to the time scale so that the time indicating member cannot be moved while the patient remains seated in the wheelchair.

The locking means comprises an elongated pad member which is attached to the time indicating member and rests on the wheelchair seat so that the time indicating member can point to the desired time on the time scale by manually positioning the pad member along the wheelchair seat. Because the pad member rests on a substantial portion of the wheelchair seat, the pad member and time indicating member cannot be moved relative to the time scale or to the wheelchair so long as a patient remains seated therein.

In use, the strip is secured to the support posts of the wheelchair backrests. Next the pad member is positioned on the wheelchair seat so that the time indicating member engages with the strip and points to the correct time. The patient is then seated in the wheelchair and on the pad member. Thereafter, the monitor device of the present invention indicates the time at which the patient was seated in the wheelchair so that the patient may be removed therefrom at the appropriate time. Significantly, the time indicating member cannot be reset to a different time due to the patient's weight resting on the pad member. Only when the patient is moved from the wheelchair can the time indicating member be set to a different time on the time scale.

It is an object of the invention to provide a monitor for effectively managing the repositioning of a patient confined to a wheelchair or a bed.

It is another object of the invention to provide such a timing apparatus which is inexpensive to manufacture so that the apparatus may be associated with each bed or wheelchair in a hospital or other health care institution.

Another object of the invention to provide a device for substantially preventing decubitus ulcers or other skin tissue degenerative conditions associated with patients being in a single position for prolonged periods of time.

A further object of the invention is to provide a wheelchair monitor which cannot be reset without removing the wheelchair-confined person from the wheelchair.

It is another object of the invention to provide a wheelchair monitor which can be operated without batteries or electricity.

Other objects, advantages and salient features of the present invention will become apparent from the following detailed description, which, when taken in conjunction with the annexed drawings, discloses preferred embodiments of the present invention.

DETAILED DESCRIPTION OF THE PREFERRED EMBODIMENTS

Referring to FIGS. 1–5, there is disclosed a monitoring device comprising strip member 1, time indicator 2, handle 3 and pad 4.

Figure 1:
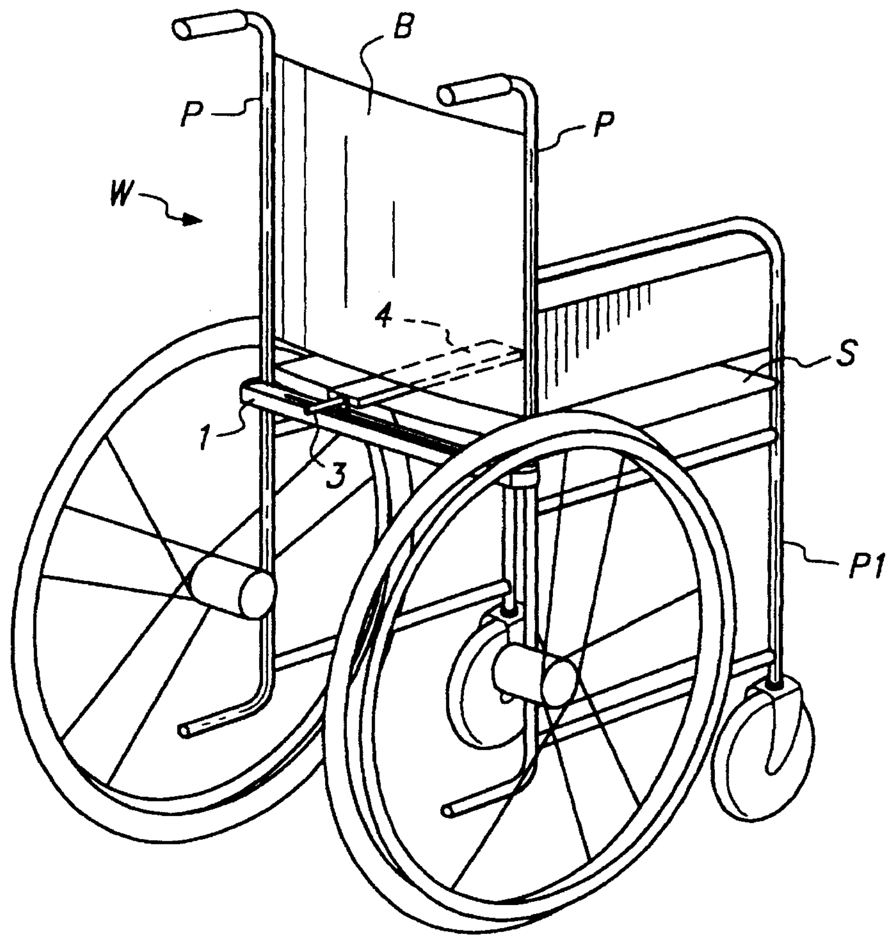
FIG. 1 is a perspective view of a preferred embodiment of the present invention connected to a wheelchair.
Figure 2:
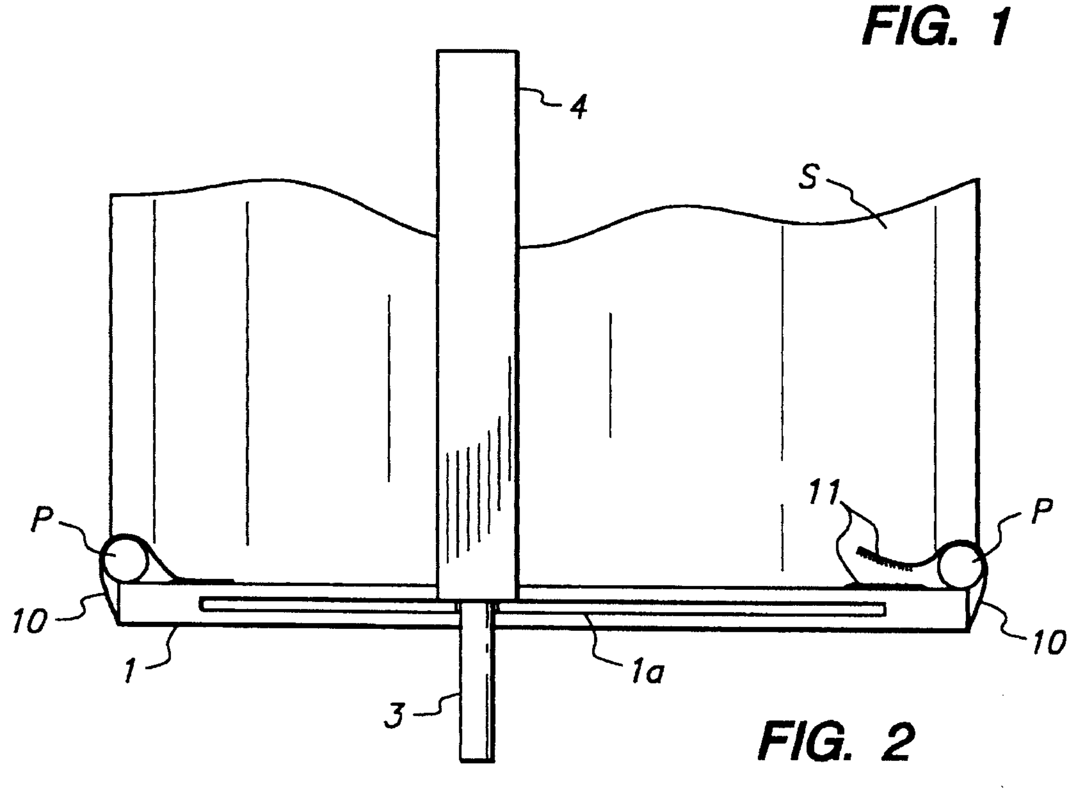
FIG. 2 is a top plan view thereof.
Figure 3:
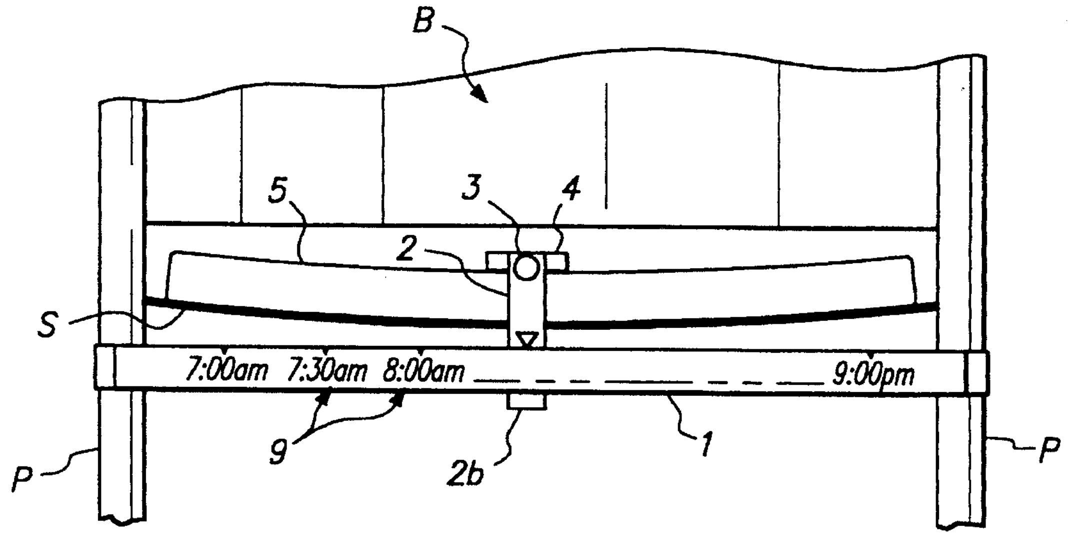
FIG. 3 is a front elevational view thereof.

According to the invention, strip 1 preferably but not necessarily includes a means for attaching strip 1 to posts P which support wheelchair backrest B so that strip 1 is substantially proximal to back portion of wheelchair seat S, as shown in FIGS. 1–3. The attaching means preferably but not necessarily comprises flexible straps 10 which are connected to either end of strip 1, and hook-and-loop fastening members 11 which are connected along flexible straps 10 and the back portion of strip 1 so that flexible straps 10 wrap substantially around posts P. Flexible straps 10 and hook-and-loop fastening members 11 are preferably but not necessarily sized so as to accommodate wheelchairs W of nonstandard sizes, such as custom designed wheelchairs for small children or large adults.

In an alternative embodiment, the attaching means may comprise a snap mechanism, a buckle mechanism or other suitable mechanical connection by which strip 1 is suspended between wheelchair posts P.

Figure 4:
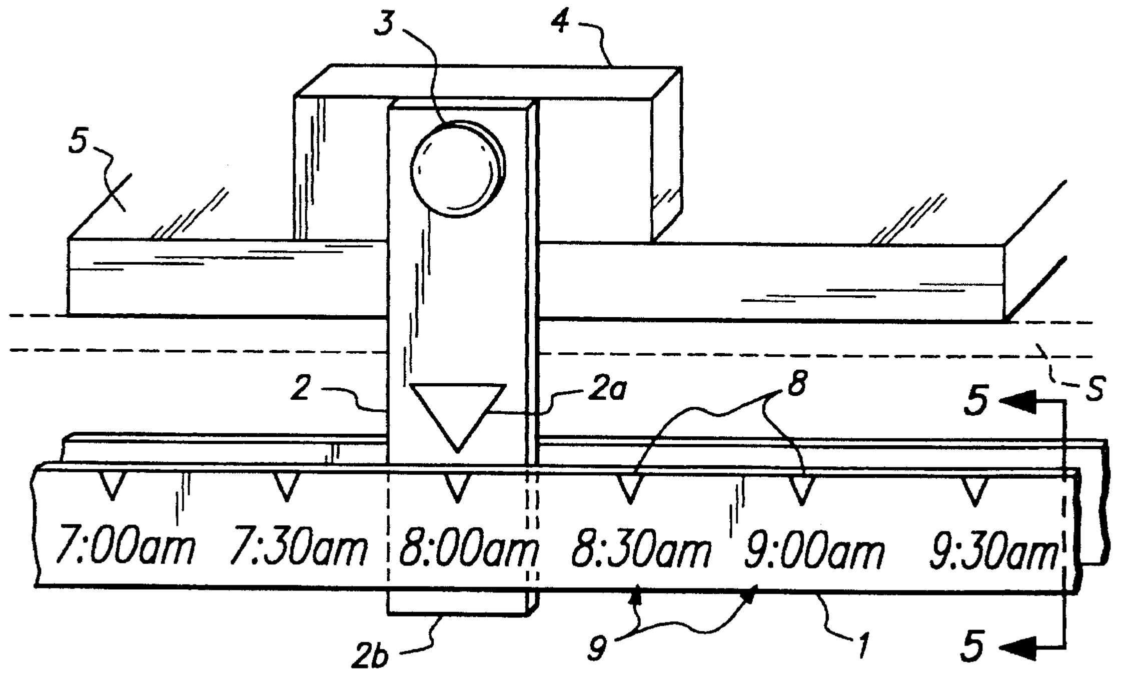
FIG. 4 is a perspective view of a preferred embodiment of the present invention.

Strip 1 preferably further includes markings printed along an outwardly facing surface thereof which form a graduated time scale. The time scale preferably but not necessarily includes a plurality of time divisions 9 denoting times of the day substantially arranged in chronological order, and markings 8 associated with each time division 9, as shown in FIG. 4. The time scale is preferably printed on a central portion of strip 1 and sized so that the time divisions 9 are legible from a distance of several feet from wheelchair W, such as ten feet therefrom.

In a preferred embodiment, the time divisions 9 are displayed in half hour increments (FIGS. 3 and 4), but in alternative embodiments the time divisions 9 are displayed in quarter hour or whole hour increments. The time scale preferably represents a substantial portion of a 24 hour day, such as time divisions 9 covering 18 hours of the day, but alternatively the time scale represents a smaller portion of a 24 hour period, such as a 6–8 hour time period.

Strip 1 is preferably but not necessarily constructed from a sturdy material, such as molded plastic or sheet metal. Alternatively, strip 1 is constructed from a flexible yet resilient material.

Referring to FIG. 2, strip 1 preferably but not necessarily includes a slot 1*a* defined substantially laterally therethrough. Slot 1*a* preferably substantially extends along the entire length of the time scale of strip 1 and cooperates with a time indicator so that the present invention may indicate a specific time displayed on the time scale of strip 1.

The preferred embodiments of the present invention preferably but not necessarily include a means for indicating a specific, chosen time division 9 of the time scale. The time indicating means preferably comprises elongated dial member 2. Dial 2 is preferably disposed proximal to the time scale of strip 1 so that an end portion of dial 2, such as the lower end portion 2*b* of dial 2, is inserted through slot 1*a* of strip 1 so that dial member 2 is slidably engaged therewith. Dial 2 further includes indicating symbol 2*a* (FIG. 4) which, when end portion 2*b* is inserted through slot 1*a* of strip 1, substantially clearly points to a particular time division 9 of the time scale. In this way, by inserting end 2*b* through slot 1*a* and sliding dial 2 along strip 1, dial 2 may be selectively positioned therealong so as to point to or otherwise indicate a time division 9 representing a chose time of day.

Figure 5:
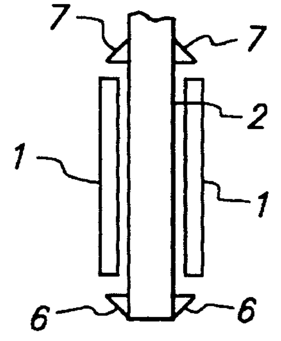
FIG. 5 is a side elevational view of the embodiment shown in FIG. 4 taken along the 5—5 line thereof.

In one preferred embodiment of the present invention, dial member 2 substantially permanently slidably engages with strip 1 so that dial 2 is prevented from being displaced therefrom. This is especially important when the monitor device is being stored or is not otherwise in use. As shown in FIG. 5, the permanent sliding engagement preferably but not necessarily includes tab members 6 and 7 which are disposed substantially longitudinally along the lower and central portion of dial 2, respectively. Tab members 6 are preferably tapered so that end portion 2*b* of dial 2 may be inserted through slot 1*a* of strip 1 but cannot be withdrawn therefrom after insertion. Tab members 7 preferably include a substantially lateral edge in order to substantially limit the extent through which dial 2 can be inserted in slot 1*a* of strip 1.

According to a preferred embodiment of the present invention, once end portion 2*b* is inserted through strip 1 so that tab members 6 are positioned beneath the lower edge thereof, dial 2 may be selectively slid along slot 1*a* relative to the time scale of strip 1. In this way, tab members 6 and 7 maintain dial 2 in an operable position relative to the time scale of strip 1.

The present invention preferably but not necessarily includes a means for manually controlling the placement of dial member 2 along strip 1 so that it points to the desired time division 9 on the time scale thereof. The manual sliding means preferably comprises handle 3 which extends substantially outwardly from the exposed or outwardly facing surface of dial member 2, as shown in FIGS. 2–4. Handle 3 is preferably substantially cylindrical and is sized so that it can be comfortably grasped by one hand in order to substantially effortlessly slide dial member 2 along strip 1.

A significant problem in providing a time monitoring apparatus for a wheelchair or other body-supporting article is that the monitoring apparatus may be inappropriately reset to a different time without repositioning the patient in the wheelchair, removing the patient from the wheelchair or otherwise addressing the needs of the patient, thereby leading to the occurrence of the above-mentioned ailments. Accordingly, the preferred embodiments of the present invention include a means for substantially preventing movement of dial 2 relative to strip 1 while the patient remains supported by the wheelchair or other article.

The movement preventing means preferably but not necessarily comprises elongated pad member 4 which is attached to an end portion of dial 2 and extends outwardly therefrom at a substantially right angle therewith, as shown in FIGS. 1–4. Pad member 4 is intended to rest on wheelchair seat S and be positioned therealong depending upon the desired position of dial member 2 relative to the time scale of strip 1. When in the desired position on wheelchair seat S and after a patient has been seated thereon, pad member 4 is substantially secured in a substantially fixed position on wheelchair seat S, which thereby substantially locks dial member 2 into the desired position relative to strip 1.

Pad member 4 is preferably constructed from a soft, resilient and inexpensive material, such as a foam composite. Alternatively, pad member 4 comprises a pillow or other upholstered cushion. By way of one example, pad member 4 is approximately 1" thick.

The present invention preferably but not necessarily includes a second pad member 5, as shown in FIGS. 3 and 4, which rests on wheelchair seat S beneath pad member 4. Second pad member 5 is intended to provide a more comfortable seating unit for the wheelchair-confined patient.

Constructed from any of a variety of firm yet resilient compounds, in one preferred embodiment pad member 5 is substantially polygonal. In a second preferred embodiment, pad member 5 has a different shape, such as one in which follows the contours of the human body. In a third preferred embodiment, pad member 5 has an egg-carton shape.

Alternatively, pad member 5 is positioned over pad member 4 so that the wheelchair-confined patient will be seated on a substantially smooth surface.

In use, strip 1 is first suspended between wheelchair backrest support posts P so that wheelchair seat S is slightly elevated relative to strip 1. Straps 10 substantially wrap around posts P so that hook-and-loop fasteners 11 engage with each other, thereby firmly attaching strip 1 to wheelchair W. Next, pad member 5 is placed over wheelchair seat S. Pad member 4 is then placed on top of pad member 5 so that end portion 2*b* of dial member 2 is inserted through slot 1*a* of strip 1. Dial member 2 may then be manually positioned along strip 1 by grasping handle 3 so that time indicating symbol 2*a* of dial member 2 points to the correct time on the time scale of strip 1.

Thereafter, by seating the wheelchair-confined patient in wheelchair W, pad member 4 and dial member 2 are substantially fixed in position relative to strip 1 so that the monitor device will indicate the time at which the patient was seated in the wheelchair. Because the monitor device accurately reflects the time period the patient has been sitting, health care providers will be able to administer the necessary medicinal and/or therapeutic actions at the appropriate time.

It is contemplated that the present invention can cooperate with a bed, such as a hospital bed, so as to indicate the amount of time a person has been in lying in a given position thereon. In this embodiment, strip 1 attaches longitudinally along a side of the bed slightly beneath the top surface thereof, and pad member 4 rests substantially laterally on top of the bed so that dial member 2 extends downwardly into engagement with slot 1*a* of strip 1. By sliding dial member 2 along slot 1*a* via handle 3, the device may be set to the correct time. Thereafter, the patient may be repositioned on the bed and pad member 4, thereby substantially securing dial member 2 relative to strip 1.

It is further contemplated that the present invention could attach along the side of a wheelchair. In this embodiment, strip 1 is suspended between a wheelchair backrest support post P and an armrest support post P1 (FIG. 1), and pad member 4 rests substantially laterally along wheelchair seat S so that dial member 2 extend downwardly into engagement with slot 1*a* of strip 1.

Although there have been described what is at present to be the preferred embodiments of the invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than by the foregoing description.

We claim:

1. A timing device for indicating a person's wheelchair usage, comprising:

a strip member having a time scale printed thereon;

means for attaching said strip member to a wheelchair;

a pointer member; and means for selectively positioning said pointer member relative to said time scale so as to indicate a time period of substantially continuous seating of a person in the wheelchair.

2. A timing device as recited in claim 1, including:

means, connected to said pointer member, for substantially locking said pointer member into position relative to said time scale while a person remains seated in the wheelchair.

3. A timing device as recited in claim 2, wherein:

said locking means is slidably positioned along the wheelchair seat so that the person is seated thereon while sitting in the wheelchair.

4. A timing device as recited in claim 3, wherein:

said locking means comprises an elongated member which rests on the wheelchair seat.

5. A timing device as recited in claim 1, wherein:

said wheelchair attaching means is connected to each end of said strip member so that said strip member is substantially suspended between the posts which support the wheelchair backrest.

6. A timing device as recited in claim 1, wherein:

said strip member includes a slot defined substantially laterally therethrough; and said pointer member is inserted substantially through said slot of said strip member so as to be slidably engaged therewith.

7. A timing device as recited in claim 1, wherein:

said pointer member is slidably engaged with said strip proximal to said timing scale.

8. A timing device as recited in claim 1, wherein:

said timing scale shows time divisions in half hour increments.

9. A timing apparatus for a indicating substantially continuous positioning of a person on a support object, comprising:

a first member having markings thereon forming a time scale;

means for attaching said first member to said support object;

a second member which is movably engaged with said first member relative to said time scale so as to selectively correspond to a time at which the person was positioned on said support object; and means for securing said second member relative to said first :member so that said second member is substantially fixed in position relative to said first member while the person remains positioned on said support object.

10. A timing apparatus as recited in claim 9, wherein:

said securing means comprises a first elongated member which is attached to a first end of said second member, and wherein said first elongated member is positioned along a surface of said support object beneath the person so that the person's weight substantially holds said second member in place relative to said support object and to said first member.

11. A timing apparatus as recited in claim 10, wherein:

said second member includes a second end which slidably engages with said first member proximal to said time scale.

12. A timing apparatus as recited in claim 11, wherein:

said support object comprises a wheelchair;

said attaching means attaches said first member between backrest support posts of said wheelchair proximal to a seat of said wheelchair;

said first elongated member slidably rests substantially longitudinally along said wheelchair seat; and said second member extends from a back portion of said wheelchair seat so as to engage with said first member.

13. A timing apparatus as recited in claim 10, wherein:

said first elongated member is constructed from a foam material.

14. A timing apparatus as recited in claim 10, further including:

a second elongated member which is positioned between said first elongated member and said surface of said support object.

15. A timing apparatus as recited in claim 12, wherein:

said second member includes a handle extending outwardly therefrom.

16. A timing apparatus as recited in claim 11, wherein:

said sliding engagement between said first member and said second member is substantially permanent.

17. A device for monitoring wheelchair usage, comprising:

a first member which removably suspends between wheelchair posts which support the wheelchair backrest, said first member having a scale printed thereon showing time divisions;

a second member which is selectively movable along said first member proximal to said scale so as to identify a specific time; and means, connected to said second member, for substantially locking said second member relative to said first member so as to substantially prevent movement thereof while a person remains seated in the wheelchair.

18. A device as recited in claim 17, wherein:

said locking means comprises an elongated member which rests on a wheelchair seat; and said second member is positioned substantially rearwardly of said wheelchair seat for engagement with said first member.

19. A device as recited in claim 18, wherein:

said first member includes a slot defined therethrough; and said second member is substantially inserted through said slot of said first member so as to slidably engage with said first member.

20. A device as recited in claim 17, wherein:

said first member is substantially elongated and includes strap members disposed at either end of thereof, said strap members having hook-and-loop fastening members attached thereon so as to suspend said first member between said posts by being wrapped therearound.

* * * * *